United States Patent Office 3,667,998
Patented June 6, 1972

3,667,998
PROCESS FOR APPLYING COHERENT COATINGS
Heinz Esser, Burscheid, Germany, assignor to Farbenfabriken Bayer Aktiengesellschaft, Leverkusen, Germany
No Drawing. Filed Sept. 26, 1969, Ser. No. 861,502
Claims priority, application Germany, Sept. 28, 1968, P 17 96 270.8
Int. Cl. B44d 1/08, 1/12
U.S. Cl. 117—105.5                                6 Claims

ABSTRACT OF THE DISCLOSURE

Process for the production of a coherent coating on a support by the method of simultaneously spraying a dispersion of rubber or synthetic resin and/or an emulsion of bitumen or tar or tar pitch, with a precipitating agent for the emulsion or dispersion, on to the support in which process a dispersion or emulsion is used which contains 5 to 85% by weight of an inorganic, non-fibrous filler, based on its total solids content.

---

It is known to produce coherent coatings by a process of spraying simultaneously a bitumen emulsion, which may contain a natural or synthetic rubber latex, with a precipitating agent, on to a support (cf. German patent specification 1,204,980).

This invention relates to a process for the production of a coherent coating on a support by the method of simultaneously spraying a dispersion of rubber or synthetic resin and/or an emulsion of bitumen or tar or tar pitch, with a precipitating agent for the emulsion or dispersion, on to the support, in which process a dispersion or emulsion is used which contains 5 to 85% by weight of an inorganic, non-fibrous filler, based on its total solids content.

Rubber and synthetic resin dispersions within the meaning of the invention consist of any known artificial or natural rubber latices or synthetic resin dispersions, provided that they can be precipitated in the form of coherent coatings by precipitating agents. Examples of such latices are natural rubber latex, latices of polybutadiene, polyisoprene and polychloroprene and copolymers of butadiene and acrylonitrile. Examples of suitable synthetic resin dispersions are dispersions of polyvinyl chloride, polyvinyl alcohol and polyurethanes.

Suitable bitumen emulsions are the so-called "semistable" or "unstable" emulsions which preferably contain a bitumen which has a penetration of between 45 and 300.

Suitable tar emulsions or tar pitch emulsions are, for example, the semi-stable or unstable tar emulsions or special pitch emulsions which can be precipitated by electrolytes, and which preferably contain tars or special pitches which have a penetration of between 45 and 300.

Aqueous solutions of inorganic salts or aqueous solutions of organic acids are particularly suitable for use as precipitating agents for these dispersions or emulsions. Examples of these are calcium chloride, calcium nitrate, alum, aluminium sulphate, acetic acid and formic acid. Other salts could also be used, but aqueous solutions of calcium salts have proved to be particularly suitable.

Suitable fillers are non-fibrous inorganic fillers. In principle, almost any of the usual rubber fillers may be used. Examples of these are bentonite, mica, asbestos, silicic acid, kaolin, chalk, lithopones and, particularly ground shale.

The rubber or synthetic resin dispersions used for the process generally contain 5 to 73% by weight of solids; the bitumen or tar and special pitch emulsions generally contain 5 to 60% by weight of solids.

Aqueous dispersions and emulsions are preferred. The rubber or synthetic resin dispersions or bitumen or tar emulsions may be used alone, but it is preferable to use mixtures of both types of emulsion. Any mixing ratio may be employed but the ratio is preferably between 5 and 30% by weight of rubber dispersion, and 5 to 30% by weight of bitumen or tar emulsion. The fillers are added to the dispersion, the emulsions or their mixtures, in amounts so that 5 to 85% by weight and preferably 20 to 30% by weight of the total solids content is made up of fillers. Incorporation of the fillers in the latices is carried out by known methods.

Thickeners may be added to prevent sedimentation of the fillers from the bitumen or tar emulsions, but these thickeners should not substantially increase the viscosity of the latices. Suitable thickeners, are, for example, alkali metal salts of polyacrylic acid, polyvinyl alcohol, casein or hydroxymethyl celluloses.

The rubber latices may, and generally do contain the usual auxiliary agents for rubber, i.e. age resistors, stabilizers and vulcanization agents. The most suitable stabilizers have been found to be the non-ionic stabilizers such as hydroxyethylated benzyl phenols or hydroxyethylated higher alcohols.

The process is very simple to carry out. The emulsion or emulsion mixture is generally sprayed through a head of a double headed spray gun, and, at the same time the aqueous solution of precipitating agent is sprayed through the second head of the spray gun. When the two sprayed materials reach the support, a uniform, dense film is formed. Almost any thickness of the film can be selected. The desired thickness of the layer can be obtained either by a single spraying or by repeated spraying. In order to improve adherence of the film to the support, a primer layer may first be sprayed without a precipitating agent, and then, when this is dry on the surface, additional layers may be sprayed together with precipitating agent, on the primer layer.

The process finds very wide application. Since the films obtained are to a large extent impermeable to gas and completely impermeable to liquids and highly flame-proof, they can be used in mines for insulating so-called fire dams. They can also be used for insulation from seepage water in structural work above or below ground and in hydraulic engineering, or for the insulation of flat roofs, foundations, waste water drains etc., from the permeation of water.

The process is generally carried out at room temperature. It is unnecessary to use higher temperatures. The advantages of the process according to the invention, over the process disclosed in German Patent Specification 1,204,980 may be summarized as follows:

(1) Substantial improvement in the non-combustibility and non-inflammability of the films;
(2) Higher flame-resistance and stiffness of the films;
(3) Greater hardness without impairing the flexibility;
(4) Improved impermeability to gases;
(5) Improved resistance to swelling in solvents;
(6) Increased softening point.

The following examples were carried out as follows: The latex mixtures indicated below were sprayed through one head of a double-spray gun onto a support and simultaneously through the second head of the spray gun a 20% aqueous calcium chloride solution was sprayed. The weight ratio of latex mixture and calcium chloride solution was 1:1.

As a support the materials indicated below were used. In this process a coherent film is formed on the support consisting of coagulated latex which contains the filler (ground shale) in homogeneously distributed form.

The films were produced in two steps producing a film thickness of 2 mm. so that the final film had a thickness of 4 mm.

EXAMPLE 1

Latex mixture:

(a) 34.5 parts by weight polychloroprene latex (58%)
4.0 parts by weight of a non-ionic emulsifier in 20% aqueous solution (b) 128.0 parts by weight of a ground shale dispersion [1]

Support: Brickwork

EXAMPLE 2

Latex mixture:

(a) 34.5 parts by weight polychloroprene latex (58%)
160.0 parts by weight bituminous emulsion (50%)
2.0 parts by weight of a nonionic emulsifier in 25% aqueous solution (b) 100.0 parts by weight ground shale dispersion [1]
4.5 parts by weight 20% aqueous solution of hydroxyethyl cellulose Support: Heraklit

EXAMPLE 3

Latex mixture:

(a) 34.5 parts by weight polychloroprene latex
160.0 parts by weight tar-pitch-emulsion (50%)

(b) 100.0 parts by weight ground shale dispersion [1]
2.0 parts by weight 20% aqueous solution of hydroxyethyl cellulose Support: Rock

EXAMPLE 4

Latex mixture:

(a) 34.5 parts by weight polychloroprene latex (58%)
4.0 parts by weight of a non-ionic emulsifier in 20% aqueous solution (b) 60.0 parts by weight of a ground shale dispersion [1]

Support: Eternit

EXAMPLE 5

Latex mixture:

(a) 34.5 parts by weight polychloroprene latex (58%)
160.0 parts by weight bituminous emulsion (50%)
2.0 parts by weight of a nonionic emulsifier in 25% aqueous solution (b) 80.0 parts by weight ground shale dispersion [1]
4.5 parts by weight 20% aqueous solution of hydroxyethyl cellulose Support: Tightly woven wire-netting

EXAMPLE 6

Latex mixture:

(a) 34.5 parts by weight polychloroprene latex
160.0 parts by weight tar-pitch-emulsion (50%)

(b) 80.0 parts by weight ground shale dispersion [1]
2.0 parts by weight 20% aqueous solution of hydroxyethyl cellulose Support: Brickwork

I claim:

1. In the process for the production of a coherent coating on a support by spraying onto the support a mixture of rubber dispersion and bitumen, tar or tar pitch dispersion and simultaneously spraying thereon a precipitating agent for said mixture, the improvement comprising spraying onto the support a mixture of rubber dispersion and bitumen, tar or tar pitch dispersion which contains, based on the dry weight, 5–30% of rubber, 5–30% of bitumen, tar or tar pitch and 5–85% by weight, based on the total solids content, of an inorganic non-fibrous filler.

2. The process of claim 1 wherein said filler is bentonite, mica, asbestos, silicic acid, kaolin, chalk, lithopone or ground shale.

3. The process of claim 1 wherein said precipitating agent is an aqueous solution of an inorganic salt or of an organic acid.

4. In the process for the production of a coherent coating on a support by spraying onto the support a rubber dispersion and simultaneously spraying thereon a precipitating agent for said dispersion, the improvement comprising spraying onto the support a latex of polybutadiene, polyisoprene, polychloroprene or butadiene-acrylonitrile copolymer which contains 5–85% by weight, based on the total solids content, of an inorganic, non-fibrous filler.

5. The process of claim 4 wherein said filler is bentonite, mica, asbestos, silicic acid, kaolin, chalk, lithopone or ground shale.

6. The process of claim 4 wherein said precipitating agent is an aqueous solution of an inorganic salt or of an organic acid.

[1] Composition of a ground shale dispersion:

| | Parts by weight |
|---|---|
| Ground shale | 75 |
| Water | 40 |
| Sodium-methylene-bis-naphthalene sulfonate | 4 |
| 20% aqueous solution of hydroxyethyl cellulose | 1.5 |

References Cited

UNITED STATES PATENTS

| 3,168,411 | 2/1965 | Walsh | 117—105.5 X |
| 3,257,231 | 6/1966 | Schmitt et al. | 117—105.5 |
| 3,257,229 | 6/1966 | Nielsen | 117—105.5 X |

EDWARD G. WHITBY, Primary Examiner

U.S. Cl. X.R.

117—104 B, 137, 163, 168, DIG 3; 252—8.1